US010761331B2

United States Patent
Li et al.

(10) Patent No.: US 10,761,331 B2
(45) Date of Patent: Sep. 1, 2020

(54) DISPLAY PANEL AND METHOD FOR CONTROLLING THE SAME, WEARABLE VR DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Chao Li, Beijing (CN); Wei Li, Beijing (CN); Yanfeng Li, Beijing (CN); Yanqing Chen, Beijing (CN); Ning Wang, Beijing (CN); Weida Qin, Beijing (CN); Pan Guo, Beijing (CN); Yongchao Wang, Beijing (CN); Haoyi Xin, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 0 days.

(21) Appl. No.: 16/214,904

(22) Filed: Dec. 10, 2018

(65) Prior Publication Data

US 2019/0204603 A1   Jul. 4, 2019

(30) Foreign Application Priority Data

Jan. 2, 2018 (CN) .......................... 2018 1 0002066

(51) Int. Cl.
*G02B 27/01* (2006.01)
*G09G 3/3233* (2016.01)
(Continued)

(52) U.S. Cl.
CPC ....... *G02B 27/0172* (2013.01); *G02B 27/017* (2013.01); *G02B 30/26* (2020.01);
(Continued)

(58) Field of Classification Search
CPC .............. G02B 27/0172; G02B 27/017; G02B 27/225; G02B 2027/0136; G02B 27/01;
(Continued)

(56) References Cited

U.S. PATENT DOCUMENTS 5,060,062 A    10/1991  Dotson
2007/0285346 A1*  12/2007  Li ......................... G02B 27/017
                                                              345/8

(Continued)

FOREIGN PATENT DOCUMENTS

CN    101329465 A    12/2008
CN    101835057 A    9/2010
(Continued)

OTHER PUBLICATIONS

First Office Action issued in corresponding Chinese Application No. 201810002066.2, dated Dec. 18, 2019, with English translation.
(Continued)

*Primary Examiner* — Abhishek Sarma
(74) *Attorney, Agent, or Firm* — McDermott Will Emery LLP (57) ABSTRACT

A display panel includes a base substrate, and a plurality of sub-pixels disposed on the base substrate and located at least in a left eye display area and a right eye display area of the display panel. The left eye display area and the right eye display area are arranged side by side. An area of the display panel outside the left eye display area and the right eye display area is a non-display area.

15 Claims, 6 Drawing Sheets

(51) Int. Cl.
*G02F 1/133* (2006.01)
*G02B 30/26* (2020.01)
*G06T 19/00* (2011.01)
*G06F 3/01* (2006.01)

(52) U.S. Cl.
CPC .............. *G02F 1/133* (2013.01); *G06F 3/013* (2013.01); *G06T 19/006* (2013.01); *G09G 3/3233* (2013.01)

(58) Field of Classification Search
CPC . G02B 5/005; G02B 2027/0134; G02F 1/133; G06F 3/013; G09G 3/3233; G06T 19/006
See application file for complete search history.

(56) References Cited

U.S. PATENT DOCUMENTS

| | | |
|---|---|---|
| 2010/0231697 A1 | 9/2010 | Nakahata et al. |
| 2014/0192303 A1 | 7/2014 | Shibata et al. |
| 2017/0004640 A1 | 1/2017 | Chu Ke et al. |
| 2017/0315372 A1* | 11/2017 | Bang .................... G02B 3/0037 |
| 2018/0017788 A1 | 1/2018 | Sun et al. |
| 2018/0232189 A1 | 8/2018 | Yang et al. |

FOREIGN PATENT DOCUMENTS

| | | |
|---|---|---|
| CN | 202886736 U | 4/2013 |
| CN | 103235444 A | 8/2013 |
| CN | 103718072 A | 4/2014 |
| CN | 103984102 A | 8/2014 |
| CN | 203838416 U | 9/2014 |
| CN | 104614859 A | 5/2015 |
| CN | 105070242 A | 11/2015 |
| CN | 106199965 A | 12/2016 |
| CN | 106773060 A | 5/2017 |

OTHER PUBLICATIONS

Second Office Action issued in corresponding Chinese Application No. 201810002066.2, dated Jul. 9, 2020, with English translation.

* cited by examiner

DISPLAY PANEL AND METHOD FOR CONTROLLING THE SAME, WEARABLE VR DISPLAY DEVICE

CROSS-REFERENCE TO RELATED APPLICATION

This application claims priority to Chinese Patent Application No. 201810002066.2, filed on Jan. 2, 2018, titled "A display panel, wearable VR display device", which is incorporated herein by reference in its entirety.

TECHNICAL FIELD

The present disclosure relates to the field of display technologies, and more particularly, to a display panel and a method for controlling the same, and a wearable VR display device.

BACKGROUND

In this era of rapid development of display technologies, VR (virtual reality) glasses are becoming more and more popular. VR glasses close people's vision and hearing to the outside world and guide users to create a sense of being in the virtual environment. The display principle is that the left eye and right eye screens display the images of the left eye and the right eye respectively. The human eyes acquire the differentiated information and then generate a stereoscopic sensation in the brain.

SUMMARY

In a first aspect of the present disclosure, a display panel is provided, and the display panel includes a base substrate and a plurality of sub-pixels disposed on the base substrate and located at least in a left eye display area and a right eye display area of the display panel. The left eye display area and the right eye display area are arranged side by side. An area of the display panel outside the left eye display area and the right eye display area is a non-display area.

In some embodiments, a part of the plurality of sub-pixels in the display panel in the display panel is located in the left eye display area, and a remaining part thereof is located in the right eye display area.

In some embodiments, the display panel further includes a light-shielding pattern disposed in the non-display area and configured to define the left eye display area and the right eye display area. A part of the plurality of sub-pixels is located in the non-display area. An orthogonal projection of the part of the plurality of sub-pixels located in the non-display area on the base substrate is within a range of an orthogonal projection of the light-shielding pattern on the base substrate.

In some embodiments, the display panel further includes a black matrix located in the left eye display area and the right eye display area. Each adjacent two sub-pixels of the plurality of sub-pixels are provided with a part of the black matrix therebetween. The light-shielding pattern and the black matrix are disposed in a same layer.

In some embodiments, the display panel further includes a color film substrate. The color film substrate includes a color film pattern. An orthogonal projection of the color film pattern on the base substrate is within ranges of orthogonal projections of the left eye display area and the right eye display area on the base substrate.

In some embodiments, the display panel further includes a plurality of first signal lines and a plurality of second signal lines. One of the plurality of first signal lines and one of the plurality of second signal lines are arranged crosswise and configured to drive at least one of the plurality of sub-pixels.

In some embodiments, the plurality of first signal lines are parallel to each other, and the plurality of second signal lines are parallel to each other. The plurality of first signal lines pass through the left eye display area and the right eye display area. A part of the plurality of second signal lines runs through the left eye display area, and a remaining part thereof runs through the right eye display area.

In some embodiments, the plurality of first signal lines are parallel to each other, and the plurality of second signal lines are parallel to each other. The plurality of first signal lines pass through the left eye display area and the right eye display area. A first part of the plurality of second signal lines runs through the left eye display area, a second part thereof runs through the right eye display area, and a third part thereof is disposed in the non-display area. The display panel further includes a light-shielding pattern disposed in the non-display area and configured to define the left eye display area and the right eye display area. Orthogonal projections of second signal lines located in the non-display area on the base substrate are within a range of an orthogonal projection of the light-shielding pattern on the base substrate.

In some embodiments, the first signal lines and the second signal lines are gate lines and data lines respectively. Alternatively, the first signal lines and the second signal lines are data lines and gate lines respectively.

In some embodiments, the left eye display area and the right eye display area are both oval.

In some embodiments, the display panel is a liquid crystal display panel or an organic electroluminescence diode display panel.

In a second aspect of the present disclosure, a wearable VR display device is provided, and the display device includes a display panel as described in the first aspect, and a gate driving circuit and a source driving circuit configured to drive the plurality of sub-pixels in the display panel.

In some embodiments, the wearable VR display device further includes at least one PCB. A part in the source driving circuit for driving sub-pixels in the left eye display area and a part therein for driving sub-pixels in the right eye display area are connected with a same PCB among the at least one PCB.

In some embodiments, the wearable VR display device further includes at least one PCB. A part in the gate driving circuit for driving sub-pixels in the left eye display area and a part therein for driving sub-pixels in the right eye display area are connected with a same PCB among the at least one PCB.

In a third aspect of the present disclosure, a method for controlling a display panel is provided. The method includes; providing an un-gated signal to sub-pixels in the non-display area of the display panel within an image frame. Alternatively, the method includes: providing a gated signal to sub-pixels in the non-display area of the display panel within an image frame to obtain gated sub-pixels; and providing a data signal matching a black screen to the gated sub-pixels in the non-display area.

BRIEF DESCRIPTION OF THE DRAWINGS

In order to describe technical solutions in embodiments of the present disclosure or in the related art more clearly, the accompanying drawings to be used in the description of embodiments or the related art will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
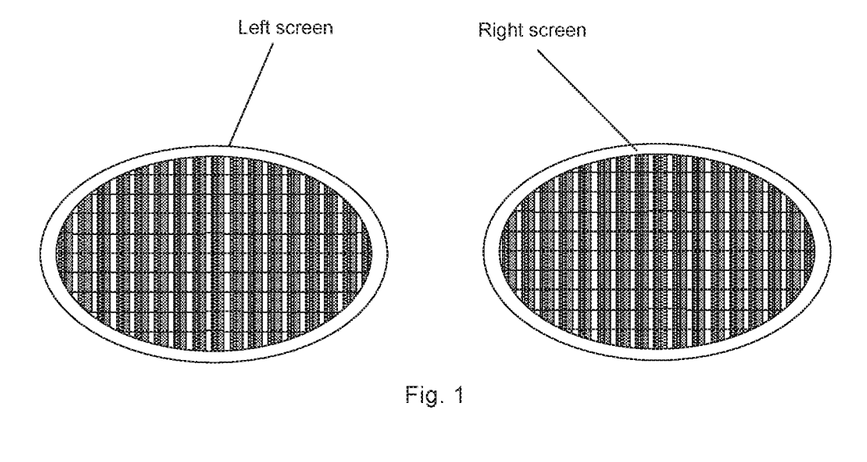
FIG. 1 is a schematic structural diagram of a display panel of a pair of VR glasses in the related art.

The VR glasses have two lenses, which correspond to a left eye and a right eye of a user respectively. Based on this, a structure of a VR display panel for the above two-lens VR glasses is shown in FIG. 1, and the VR display panel includes two display screens, namely a left screen and a right screen. The left screen and the right screen display left eye images and right eye images independently. In this case, the left eye of the user wearing the two-lens VR glasses can receive the left eye images of the left screen through a left lens, and the right eye thereof can receive the right eye images of the right screen through a right lens. The left eye image and the right eye image are superimposed in the user's brain to become a stereoscopic image.

In the above display panel, on the one hand, structures of the two display panels may not be exactly the same due to the reasons like production process, so there will be differences in display effects. On the other hand, the driving circuits in the two display screens are connected to different PCBs (Printed Circuit Boards). In this way, since there are some differences between the two PCBs in the process of signal control, the differences of display effects between the left screen and the right screen in the VR display panel may be further increased, thereby reducing the user experience.

Figure 2:
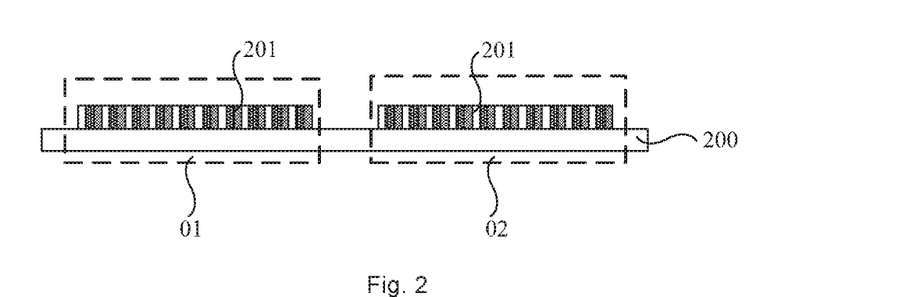
FIG. 2 is a schematic structural diagram of a display panel according to some embodiments of the present disclosure.

With regard to the above problems, some embodiments of the present disclosure provide a display panel. As shown in FIG. 2, the display panel includes a base substrate 200.

In some examples, the base substrate 200 is a single-layer transparent substrate. In some other examples, the base substrate 200 includes a single-layer transparent substrate and a thin film layer disposed on the transparent substrate.

For example, the display panel is a liquid crystal display panel, and the base substrate 200 is a single-layer glass substrate.

In some other examples, the display panel is an organic electroluminescence diode display panel, and the base substrate 200 is a single-layer flexible transparent substrate. Alternatively, thin film transistors in the organic electroluminescence diode display panel are top-gate thin film transistors, and the base substrate 200 includes a single-layer flexible transparent substrate and a light-shielding layer disposed on the flexible transparent substrate.

In addition, the display panel further includes a plurality of sub-pixels 201 disposed on the base substrate and located at least in a left eye display area 01 and a right eye display area 02 of the display panel.

The above sub-pixels 201 are configured to emit primary light or white light. In some examples, at least three sub-pixels 201 that emit light of different primary colors form a pixel unit. Alternatively, at least three sub-pixels 201 that emit light of different primary colors and one sub-pixel 201 that emits white light form a pixel unit.

For example, a pixel unit includes three sub-pixels that emit red light, blue light and green light respectively. In some other examples, a pixel unit includes three sub-pixels that emit cyan light, magenta light and yellow light respectively. In some other examples, the pixel units in the above two cases further include a sub-pixel that emits white light.

Figure 3A:
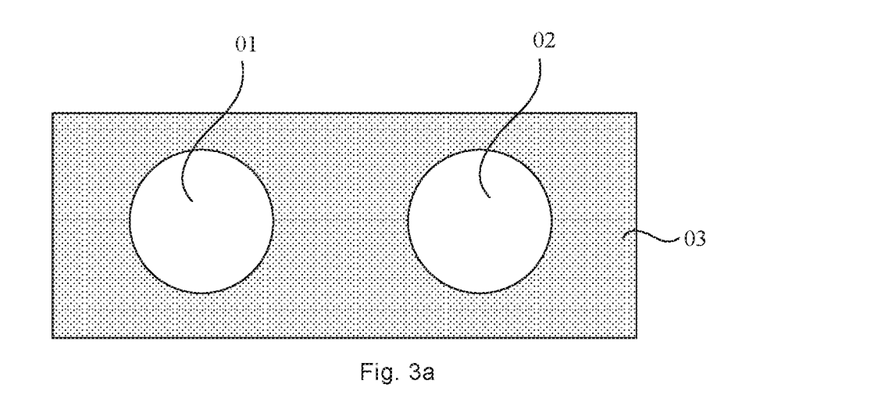
FIG. 3a is a diagrammatic top view of a display panel according to some embodiments of the present disclosure.
Figure 3B:
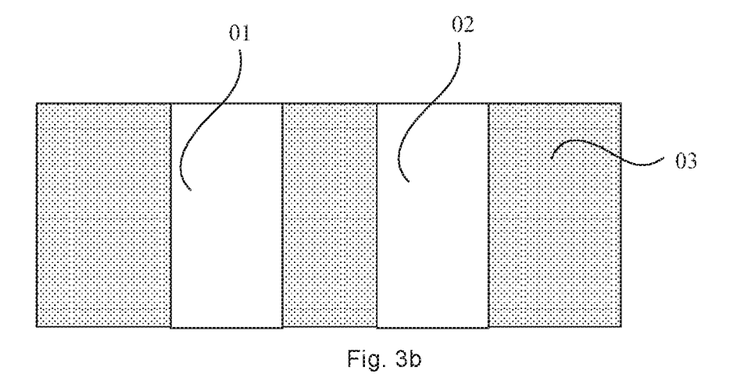
FIG. 3b is a diagrammatic top view of another display panel according to some embodiments of the present disclosure.

In addition, as shown in FIG. 3a or FIG. 3b, the left eye display area 01 and the right eye display area 02 are arranged side by side. Under this circumstance, when the display panel is watched, the left eye display area 01 is corresponding to the user's left eye, and the right eye display area 02 is corresponding to the user's right eye.

In addition, an area of the display panel outside the left eye display area 01 and the right eye display area 02 is a non-display area 03 of the display panel.

Figure 4A:
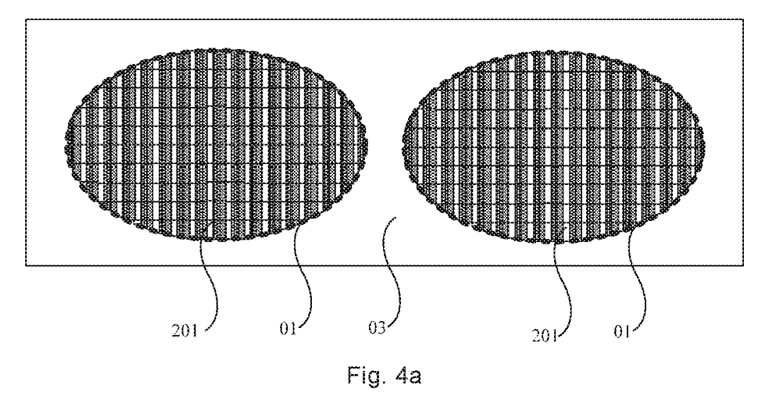
FIG. 4a is a diagrammatic top view of still another display panel according to some embodiments of the present disclosure.

It will be noted that shapes of the left eye display area 01 and the right eye display area 02 are not limited herein. In some examples, as shown in FIG. 3a, the left eye display area 01 and the right eye display area 02 are both circular. In some other examples, as shown in FIG. 3b, the left eye display area 01 and the right eye display area 02 are both rectangular. In some other examples, as shown in FIG. 4a, the left eye display area 01 and the right eye display area 02 are both elliptic. The left eye display area 01 and the right eye display area 02 are arranged side by side, and then long axes of the two ellipses are in a straight line.

The display panel is finally divided into the left eye display area 01, the right eye display area 02, and the non-display area 03. Area division of the base substrate that bear the sub-pixels may be the same as or different from the final area division of the display panel, as long as the display panel finally satisfies the above area division.

In some embodiments, the display panel is a liquid crystal display panel, and the liquid crystal display panel includes an array substrate and an aligned substrate. At this time, in some examples, the area division of the array substrate and the area division of the aligned substrate are both the same as the final area division of the display panel. In some other examples, the area division of the array substrate is the same as the final area division of the display panel, but the area division of the aligned substrate is different from the final area division of the display panel. In some other examples, the area division of the array substrate is different from the final area division of the display panel, but the area division of the aligned substrate is the same as the final area division of the display panel. In some other examples, neither the area division of the array substrate nor the area division of the aligned substrate is the same as the final area division of the display panel, but area division of a panel formed after the array substrate is aligned with the aligned substrate is the same as the final area division of the display panel.

In the display panel provided by the embodiments of the present disclosure, the sub-pixels 201 in the left eye display area 01 and the right eye display area 02 are disposed on a same base substrate 200 so as to be formed synchronously during the preparation process, thereby reducing the difference of preparation process between the left eye display area 01 and the right eye display area 02. Thus, the difference of display effect between the left eye display area 01 and the right eye display area 02 is reduced, and the user experience is improved.

In some embodiments, as shown in FIG. 4a, a part of all the sub-pixels 201 in the display panel is located in the left eye display area 01, and a remaining part thereof is located in the right eye display area 02. That is, no sub-pixel 201 is arranged in the non-display area 03 of the display panel. Since all the sub-pixels 201 are only arranged in the left eye display area 01 and the right eye display area 02, the proportion of an area, which is not used for displaying an image, (i.e., the non-display area 03) in the entire display panel is increased. This may facilitate the layout of structures in the non-display area 03 and reduce the production technology difficulty.

Figure 4B:
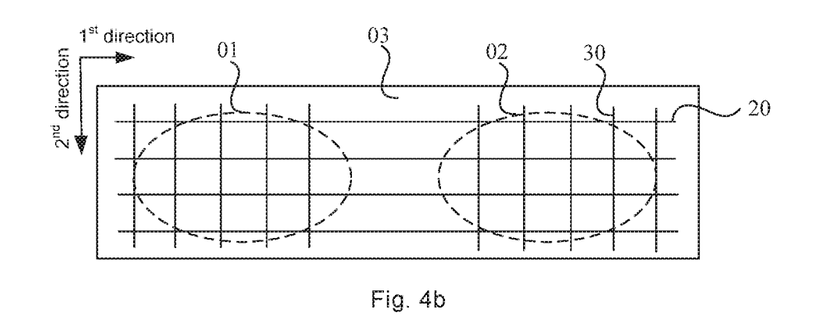
FIG. 4b is a diagrammatic top view of yet still another display panel according to some embodiments of the present disclosure.
Figure 5:
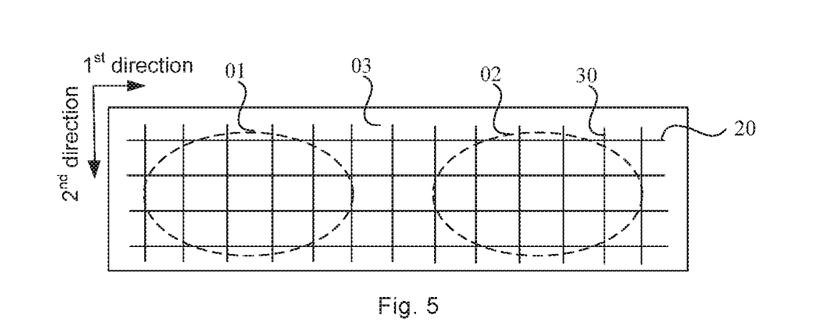
FIG. 5 is a diagrammatic top view of yet still another display panel according to some embodiments of the present disclosure.

In some embodiment, as shown in FIG. 4b and FIG. 5a, the display panel further includes a plurality of first signal lines 20 and a plurality of second signal lines 30. One of the plurality of first signal lines 20 and one of the plurality of second signal lines 30 are arranged crosswise and configured to drive at least one of the plurality of sub-pixels.

It is noted that the arrangement of the first signal lines 20 and the second signal lines 30 is not limited herein, and it is available as long as the plurality of first signal lines 20 and the plurality of second signal lines 30 are at least ensured to drive the plurality of sub-pixels in the display panel.

In some embodiment, as shown in FIG. 4b, the plurality of first signal lines 20 are parallel to each other, and the plurality of second signal lines 30 are parallel to each other.

In addition, the plurality of first signal lines 20 pass through the left eye display area 01 and the right eye display area 02, A part of the plurality of second signal lines 30 runs through the left eye display area 01, and a remaining part thereof runs through the right eye display area 02.

FIG. 4b shows examples in which the plurality of first signal lines 20 and the plurality of second signal lines 30 are arranged in the array substrate. In this case, the description "the plurality of first signal lines 20 pass through the left eye display area 01 and the right eye display area 02" means that the first signal lines 20 extend at least from a left side of the left eye display area 01 to a right side of the right eye display area 02 along a direction of a line connecting the two display areas (i.e., a first direction in FIG. 4), and may also extend to the non-display area 03.

In addition, the description "a part of the plurality of second signal lines 30 runs through the left eye display area 01" means that a part of the plurality of second signal lines 30 extends from an upper side of the left eye display area 01 to a lower side of left eye display area 01 (along a second direction in FIG. 4b), such that each of the part of the plurality of second signal lines 30 intersects with all the first signal lines 20. In some examples, the part of the plurality of second signal lines 30 extends to the non-display area 03.

The description "a remaining part of the plurality of second signal lines 30 runs through the right eye display area 02" means that a remaining part of the plurality of second signal lines 30 extends from an upper side of the right eye display area 02 to a lower side of the right eye display area 02 (along a second direction in FIG. 4b), such that each of the remaining part of the plurality of second signal lines 30 intersects with all the first signal lines 20. In some examples, the remaining part of the plurality of second signal lines 30 extends to the non-display area 03.

Thus, areas defined by intersection of the plurality of first signal lines 20 and the plurality of second signal lines 30 may all be provided with the above sub-pixels 201 respectively. In this case, it may be achieved that sub-pixels 201 are only arranged in the left eye display area 01 and the right eye display area 02 of the display panel, and sub-pixels 201 are not arranged in the non-display area 0.

As shown in FIG. 4b, one or more of the first signal lines 20 or the second signal lines 30 may be tangent to edges of a corresponding display area, which depends on the shapes of the display area. For example, the left eye display area 01 or the right eye display area 02 is circular or elliptical, and there may exist the circumstance that one or more of the first signal lines 20 or one or more of the second signal lines 30 are tangent to edges of the left eye display area 01 or the right eye display area 02. In this case, in some examples, a signal is not provided to the signal lines that are tangent to the above display areas during the display process.

It is noted that the description "sub-pixels 20 are not arranged in the non-display area 03" means that a whole row of sub-pixels 201 will not be provided in the non-display area 03. If the left eye display area 01 and the right eye display area 02 are elliptical, the case that a part of each of some sub-pixel 201 is located in the left eye display area 01 or the right eye display area 02 while a remaining part thereof is in the non-display area 03 at edges of the display areas does not belong to the case of arranging sub-pixels in the non-display area 03.

Figure 6:
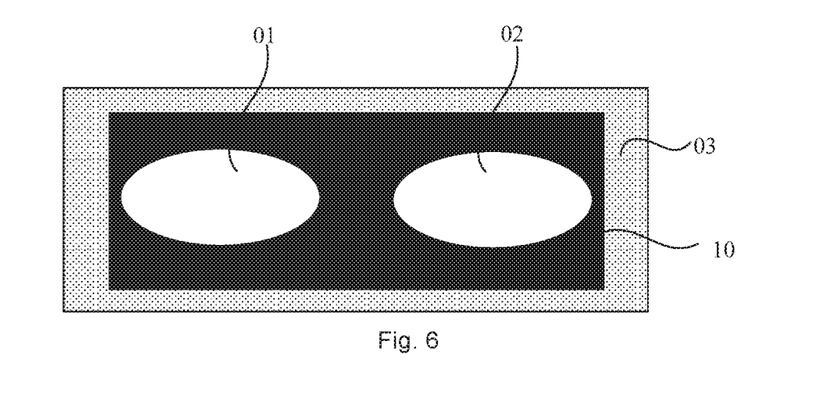
FIG. 6 is a diagrammatic top view of yet still another display panel according to some embodiments of the present disclosure.

In some embodiments, as shown in FIG. 6, the display panel further includes a light-shielding pattern 10 disposed in the non-display area 03 and configured to define the left eye display area 01 and the right eye display area 02.

In some embodiments, a part of the plurality of sub-pixels 201 is located in the non-display area 03. In addition, an orthogonal projection of the part of the plurality of sub-pixels 201 located in the non-display area 03 on the base substrate 200 is within a range of an orthogonal projection of the light-shielding pattern 10 on the base substrate 200.

That is, the part of the plurality of sub-pixels 201 in the non-display area 03 is corresponding to the light-shielding pattern 10.

In this case, the plurality of sub-pixels 201 can be arranged not only in the left eye display area 01 and the right eye display area 02, but also in the non-display area 03.

By arranging the light-shielding pattern 10 such that the orthogonal projection of the part of the plurality of sub-pixels 201 located in the non-display area 03 on the base substrate 200 is within the range of the orthogonal projection of the light-shielding pattern 10 on the base substrate 200, the light emitted by the sub-pixels 201 located in the non-display area 03 may be shielded by the light-shielding pattern 10, thereby making the display panel only display in the left eye display area 01 and the right eye display area 02.

Figure 7:
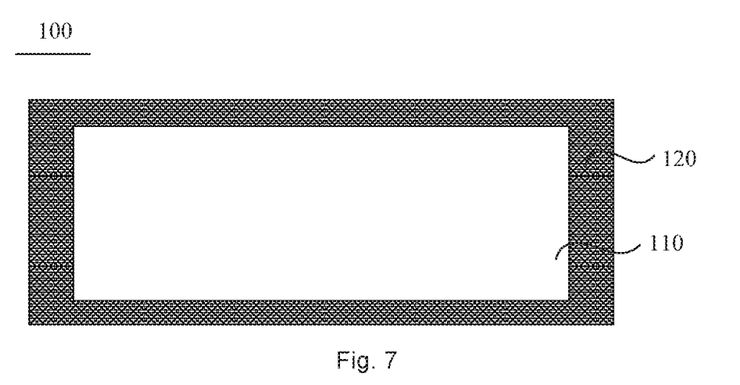
FIG. 7 is a diagrammatic top view of an array substrate according to some embodiments of the present disclosure.

In some embodiments, the sub-pixels 201 are arranged in an array, and as shown in FIG. 7, the array substrate 100 are divided into a pixel area 110 (an area where sub-pixels 201 are arranged) and a non-pixel area 120 (an area where no sub-pixel 201 is arranged).

In this case, sub-pixels 201 located in a portion of the above pixel area 110 outside the left eye display area 01 and the right eye display area 02 may be shielded by the light-shielding pattern 10.

Figure 8:
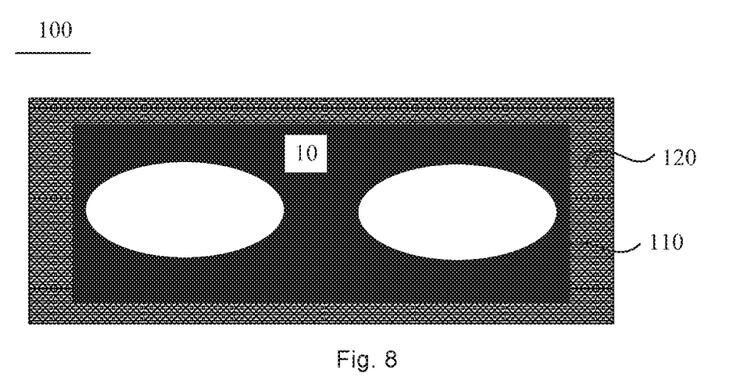
FIG. 8 is a diagrammatic top view of another array substrate according to some embodiments of the present disclosure.

In some embodiments, the display panel is an LCD panel, and the light-shielding pattern 10 is disposed in the array substrate. Alternatively, the light-shielding pattern 10 is disposed in an aligned substrate that is aligned with the array substrate to form a liquid crystal cell. FIG. 8 illustrates examples in which the light-shielding pattern 10 is arranged in the array substrate 100.

In some examples, the light-shielding pattern 10 is disposed in the non-display area 03 to define the left eye display area 01 and the right eye display area 02, but it does not cover the whole non-display area 03, Alternatively, the light-shielding pattern 10 covers the whole non-display area 03.

Properties of the light-shielding pattern 10, such as its material and thickness are not limited herein, as long as they can achieve the light-shielding effect and enable the area of the display panel corresponding to the light-shielding pattern 10 not to display the screen.

Moreover, in the case that the array substrate 100 is divided into the pixel area 110 and the non-pixel area 120, as shown in FIG. 7, the description "the light-shielding pattern 10 is configured to define the left eye display area 01 and the right eye display area 02" means that, as shown in FIG. 8, the light-shielding pattern 10 is disposed in the pixel area 110 of the array substrate 100, but for the whole display panel, the area corresponding to the light-shielding pattern 10 belongs to the non-display area 03 of the display panel.

In some embodiments, sub-pixels 201 are arranged at positions corresponding to the light-shielding pattern 10 respectively, so that the sub-pixels 201 in the pixel area 110 of the array substrate 100 are arranged in a matrix. In this way, in the case that the left eye display area 01 and the right eye display area 02 are circular or elliptical, in the production process, there is no need to make the arrangement of the sub-pixels 201 at the edges of the left eye display area 01 and the right eye display area 02 satisfy the shapes of edge contours of the display areas mentioned above, so as to simplify the production process.

In this case, by means of the light-shielding pattern 10, the display panel can include the left eye display area 01 and the right eye display area 02, thus reducing the cost of changing the process.

In some embodiments, as shown in FIG. 5, the plurality of first signal lines 20 are parallel to each other, and the plurality of second signal lines 30 are parallel to each other.

In addition, the plurality of first signal lines 20 pass through the left eye display area 01 and the right eye display area 02. A first part of the plurality of second signal lines 30 run through the left eye display area 01, a second part thereof run through the right eye display area 02, and a third part thereof is disposed in the non-display area 03.

In some embodiments, the display panel further includes a light-shielding pattern 10 disposed in the non-display area 03 and configured to define the left eye display area 01 and the right eye display area 02, and an orthogonal projection of the third part of the plurality of second signal lines 30 located in the non-display area 03 on the base substrate 200 are within a range of an orthogonal projection of the light-shielding pattern 10 on the base substrate 200. That is, the third part of the plurality of second signal lines 30 in the non-display area 03 is corresponding to an area in the non-display area 03 where the light-shielding pattern 10 is disposed.

In some embodiments, the characteristics like the extension direction and length of the third part of the plurality of second signal lines 30 in the non-display area 03 and a distance between two adjacent second signal lines 30 are arranged in a same manner as the second signal lines 30 passing through the left eye display area 01 and the right eye display area 02.

In some embodiments, the second signal lines 30 are arranged at the positions corresponding to the light-shielding pattern 10, so that in the left eye display area 01, the right eye display area 02, and the non-display area 03, the second signal lines 30 and the first signal lines 20 intersect to define the plurality of sub-pixels 201. In this way, in the pixel area 110 of the array substrate 100 (as shown in FIG. 7), the sub-pixels 201 can be arranged in a matrix, which simplifies the fabrication process of the array substrate 100.

Figure 9:
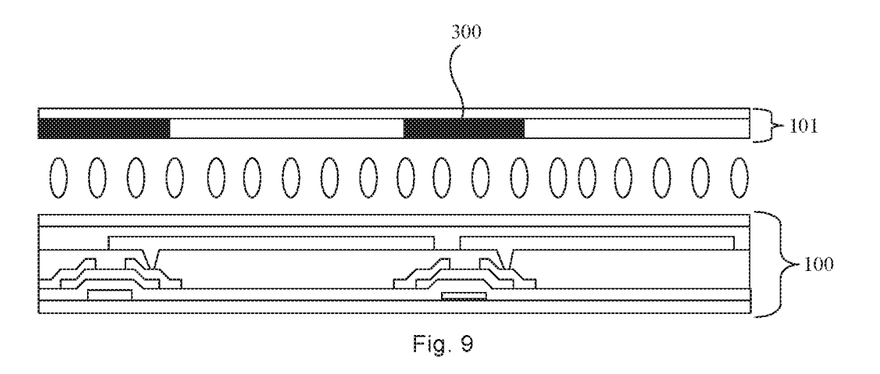
FIG. 9 is a schematic structural diagram of a display panel according to some embodiments of the present disclosure.

In some embodiments, as shown in FIG. 9, the display panel further includes a black matrix 300 disposed in the left eye display area 01 and the right eye display area 02, and each adjacent two sub-pixel 201a are provided with a part of the black matrix therebetween. To simplify the production process, in some embodiments, the light-shielding pattern 10 and the black matrix 300 are disposed in a same layer.

It is noted that the description "disposed in a same layer" here means that when the light-shielding pattern 10 and the black matrix 300 are prepared, they are formed synchronously, but they are not limited to be on a same plane.

In some embodiments, the material of the light-shielding pattern 10 is the same as that of the black matrix 300. The thin film material constituting the black matrix 300 is patterned at the time of preparation to form the above light-shielding pattern 10 and the black matrix 300.

In some embodiments, the display panel is an LCD panel, and the black matrix 300 is disposed in the array substrate 100. Alternatively, the black matrix 300 is disposed in a color film substrate 101 as shown in FIG. 9.

In some embodiments; the first signal lines 20 are data lines and the second signal lines 30 are gate lines. In some other embodiments, the first signal lines 20 are gate lines, and the second signal lines 30 are data lines. The following embodiments are descripted by taking the first signal lines 20 being gate lines and the second signal lines 30 being data lines as an example.

The material; width and other characteristics of the first signal lines 20 and the second signal lines 30 are not limited herein.

In some embodiments, the display panel, as shown in FIG. 9, is a liquid crystal display panel including the array substrate 100, the color film substrate 101 and a liquid crystal layer.

Figure 11:
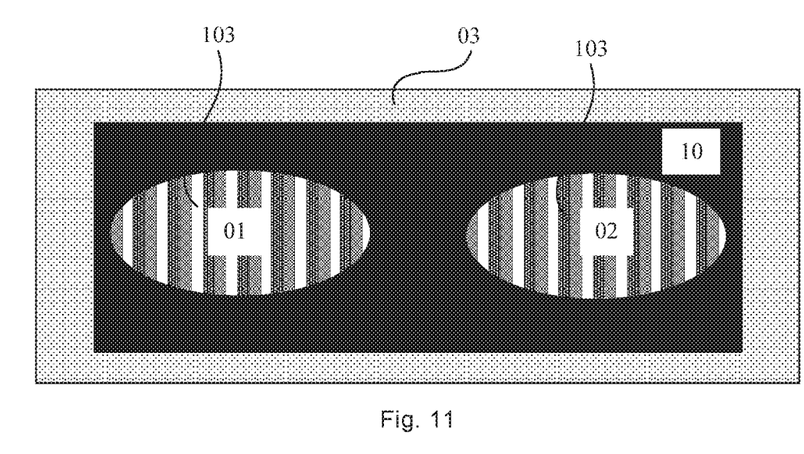
FIG. 11 is a diagrammatic top view of another display panel according to some embodiments of the present disclosure.

On this basis, in some examples, as shown in in FIG. 11, the display panel further includes a color film pattern disposed in the color film substrate 101. Based on this, to enable color display of the display panel, an orthogonal projection of the color film pattern 103 on the base substrate 200 is within ranges of orthogonal projections of the left eye display area 01 and the right eye display area 02 on the base substrate 200.

Figure 10:
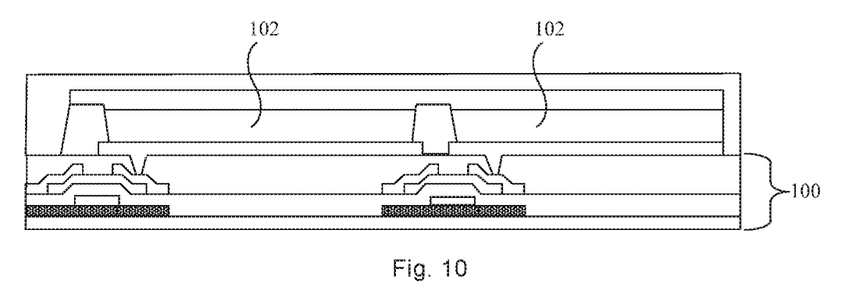
FIG. 10 is a schematic structural diagram of another display panel according to some embodiments of the present disclosure.

Alternatively, the display panel is, as shown in FIG. 10, an organic electroluminescence diode display panel including an array substrate 100 and a plurality of light-emitting diodes 102 that are arranged in an array in the array substrate 100.

Figure 12:
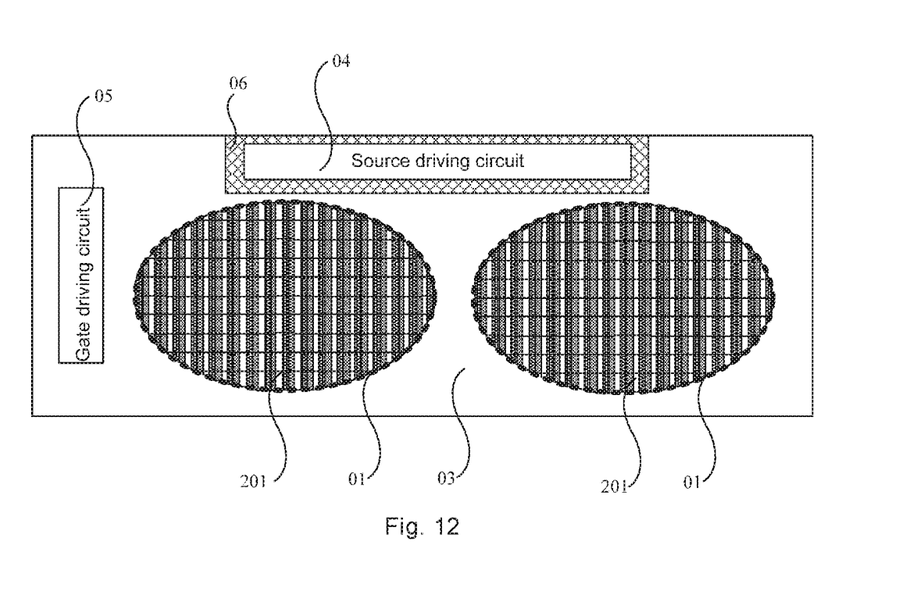
FIG. 12 is a diagrammatic top view of a wearable VR display device according to some embodiments of the present disclosure.

Some embodiments of the present disclosure provide a wearable VR display device, and the display device includes the display panel described above, and a gate driving circuit 05 and a source driving circuit 04 configured to drive the plurality of sub-pixels 201 in the display panel, as shown in FIG. 12.

Here, the gate driving circuit 05 is for example a GOA circuit (Gate Driver on Array, an integrated gate driving circuit) made in the non-display area 03 of the display panel, or an IC (integrated circuit) bonded to the non-display area 03 of the display panel.

Since the wearable VR display device includes the display panel described above, its advantageous effects are the same as those of the above display panel, which will not be elaborated here.

In some embodiments, as shown in FIG. 12, the wearable VR display device includes at least one PCB (Printed Circuit Board) 06.

On this basis, in some embodiments, a part in the source driving circuit 04 configured to drive sub-pixels 201 in the left eye display area 01 and a part therein configured to drive sub-pixels in the right eye display area 02 are connected with a same PCB 06. That is to say, sub-pixels 200 in the left eye display area 01 and the right eye display area 02 are controlled by a same PCB 06 and are driven synchronously.

Based on this, taking the first signal lines 20 being gate lines and the second signal lines being date lines shown in FIG. 5 as an example, in some examples, gate lines pass through the left eye display area 01 and the right eye display area 02, and the gate driving circuit 05 is connected with all the gate lines. In this case, a part in the gate driving circuit 05 for driving sub-pixels in the left eye display area 01 and a part therein for driving sub-pixels in the right eye display area 02 are a same part. For example, sub-pixels 201 that are located in a same row in the left eye display area 01 and the right eye display area 02 are driven by a same stage of shift register in the gate driving circuit 05. Thus, a gate line connected with the shift register can drive the sub-pixels in the left eye display area 01 and the right eye display area 02 simultaneously.

Alternatively, the left eye display area 01 and the right eye display area 02 are driven by different gate lines, and the wearable VR display device includes two gate driving circuits. One gate driving circuit is configured to drive sub-pixels 201 in the left eye display area 01, and another gate driving circuit is configured to drive sub-pixels 201 in the right eye display area 02. The above two gate driving circuits are connected with a same PCB.

In some examples, the above two gate driving circuits are provided at a same side. Alternatively, the gate driving circuit configured to drive the sub-pixels 201 in the left eye display area 01 is disposed at a left side of the left eye display area 01, and the gate driving circuit configured to drive the sub-pixels 201 in the right eye display area 02 is disposed at a right side of the right eye display area 02.

In the above embodiments, the left eye display area 01 and the right eye display area 02 are simultaneously driven by a same gate driving circuit 05, or two different gate driving circuits, and a part in the source driving circuit 04 for driving sub-pixels 201 in the left eye display area 01 and a part therein for driving sub-pixels 201 in the right eye display area 02 are connected with a same PCB 06, such that the left eye display area 01 and the right eye display area 02 are driven simultaneously. This avoids the problem that the display effect of the left eye display area 01 differs from the display effect of the right eye display area 02 caused by transmitting signals using two PCBs.

In some other embodiments, a part in the gate driving circuit 05 for driving sub-pixels 201 in the left eye display area 01 and a part therein for driving sub-pixels 201 in the right eye display area 02 are connected with a same PCB 06. That is to say, sub-pixels 201 in the left eye display area 01 and the right eye display area 02 are controlled by a same PCB and are driven synchronously.

Based on this, the first signal lines 20 being data lines and the second signal lines 30 being gate lines shown in FIG. 5 are taken as an example, and positions of the gate driving circuit 05 and the source driving circuit 04 are interchanged, so that data lines pass through the left eye display area 01 and the right eye display area 02, and the source driving circuit 04 is connected with all the data lines. In this case, a part in the source driving circuit 04 for driving sub-pixels 201 in the left eye display area 01 and a part therein for driving sub-pixels 201 in the right eye display area 02 are a same part. For example, sub-pixels 201 located in a same row of the left eye display area 01 and the right eye display area 02 are driven by a same driving channel in the source driving circuit 04. Thus, a data line can drive the left eye display area 01 and the right eye display area 02 simultaneously.

Alternatively, the left eye display area 01 and the right eye display area 02 are driven by different data lines, and the wearable VR display device includes two source driving circuits 04. One source driving circuit 04 is configured to drive sub-pixels 201 in the left eye display area 01, and another source driving circuit 04 is configured to drive sub-pixels 201 in the right eye display area 02. The above two source driving circuits 04 are connected with a same PCB.

In some examples, the above two source driving circuits are provided at a same side. Alternatively, the source driving circuit configured to drive the sub-pixels 201 in the left eye display area 01 is disposed at a left side of the left eye display area 01, and the source driving circuit configured to drive the sub-pixels 201 in the right eye display area 02 is disposed at a right side of the right eye display area 02.

In the embodiments, the left eye display area 01 and the right eye display area 02 are simultaneously driven by a same source driving circuit 04 or two different source driving circuits 04, and a part in the gate driving circuit 05 for driving sub-pixels 201 in the left eye display area 01 and a part therein for driving sub-pixels 201 in the right eye display area 02 are connected with a same PCB 06, such that the left eye display area 01 and the right eye display area 02 are driven simultaneously. This avoids the problem that the display effect of the left eye display area 01 differs from the display effect of the right eye display area 02 caused by transmitting signals using two PCBs.

In some embodiments, sub-pixels 201 are also provided in an area of the display panel corresponding to the light-shielding pattern 10, and a method for controlling the display panel is provided. The method includes: providing an un-gated signal to sub-pixels 201 in the non-display area 03 of the display panel within an image frame.

In this case, since the sub-pixels 201 in an area of the non-display area 03 corresponding to the light-shielding pattern 10 are not gated, no picture is displayed.

Alternatively, the above method includes: providing a gated signal to sub-pixels 201 in the non-display area 03 of the display panel within an image frame, and then providing a data signal matching a black screen to the gated sub-pixels 201 in the non-display area 03.

In this case, sub-pixels 201 are arranged in an area of the non-display area 03 corresponding to the light-shielding pattern 10, and a long black screen is displayed.

In some embodiments, to facilitate preparation, sub-pixels 201 are fabricated in the non-display area 03, and the sub-pixels 201 are arranged in a matrix. Besides, based on this structure, in order to lower the driving cost at the time of using the display panel, sub-pixels 201 in an area corresponding to the light-shielding pattern 10 do not display a picture or display a black screen.

The above embodiments are merely some embodiments of the present disclosure, but the protection scope of the present disclosure is not limited thereto. Any person skilled in the art could readily conceive of changes or replacement within the technical scope disclosed in the present disclosure, which all shall be included in the protection scope of the present disclosure. Therefore, the protection scope of the present disclosure shall be determined by the protection scope of the claims.

What is claimed is:

1. A display panel, comprising:
  a base substrate;
  a plurality of sub-pixels disposed on the base substrate and located at least in a left eye display area and a right eye display area of the display panel; and
  a light-shielding pattern disposed in a non-display area and configured to define the left eye display area and the right eye display area, wherein
  the left eye display area and the right eye display area are arranged side by side, an area of the display panel outside the left eye display area and the right eye display area is a non-display area, a part of the plurality of sub-pixels is located in the non-display area, and an orthogonal projection of the part of the plurality of sub-pixels located in the non-display area on the base substrate is within a range of an orthogonal projection of the light-shielding pattern on the base substrate.

2. The display panel according to claim 1, wherein a part of the plurality of sub-pixels in the display panel is located in the left eye display area, and a remaining part thereof is located in the right eye display area.

3. The display panel according to claim 1, further comprising a black matrix located in the left eye display area and the right eye display area, wherein
  each adjacent two sub-pixels of the plurality of sub-pixels are provided with a part of the black matrix therebetween, and the light-shielding pattern and the black matrix are disposed in a same layer.

4. The display panel according to claim 1, further comprising a color film substrate, wherein the color film substrate includes a color film pattern;
  an orthogonal projection of the color film pattern on the base substrate is within ranges of orthogonal projections of the left eye display area and the right eye display area on the base substrate.

5. The display panel according to claim 1, further comprising a plurality of first signal lines and a plurality of second signal lines, wherein one of the plurality of first signal lines and one of the plurality of second signal lines are arranged crosswise and configured to drive at least one of the plurality of sub-pixels.

6. The display panel according to claim 5, wherein the plurality of first signal lines are parallel to each other, and the plurality of second signal lines are parallel to each other;
  the plurality of first signal lines pass through the left eye display area and the right eye display area;
  a part of the plurality of second signal lines runs through the left eye display area, and a remaining part thereof runs through the right eye display area.

7. The display panel according to claim 5, wherein the plurality of first signal lines are parallel to each other, and the plurality of second signal lines are parallel to each other;
  the plurality of first signal lines pass through the left eye display area and the right eye display area;
  a first part of the plurality of second signal lines runs through the left eye display area, a second part thereof runs through the right eye display area, and a third part thereof is disposed in the non-display area;
  the display panel further comprises a light-shielding pattern disposed in the non-display area and configured to define the left eye display area and the right eye display area;
  orthogonal projections of second signal lines located in the non-display area on the base substrate are within a range of an orthogonal projection of the light-shielding pattern on the base substrate.

8. The display panel according to claim 5, wherein the first signal lines and the second signal lines are gate lines and data lines respectively, or
  the first signal lines and the second signal lines are data lines and gate lines respectively.

9. The display panel according to claim 1, wherein the left eye display area and the right eye display area are both oval.

10. The display panel according to claim 1, wherein the display panel is a liquid crystal display panel or an organic electroluminescence diode display panel.

11. A wearable VR display device, comprising:
  the display panel according to claim 1, and
  a gate driving circuit and a source driving circuit which are configured to drive the plurality of sub-pixels in the display panel.

12. The wearable VR display device according to claim 11, further comprising at least one PCB, wherein
  a part in the source driving circuit for driving sub-pixels in the left eye display area and a part therein for driving sub-pixels in the right eye display area are connected with a same PCB among the at least one PCB.

13. The wearable VR display device according to claim 11, further comprising at least one PCB, wherein
  a part in the gate driving circuit for driving sub-pixels in the left eye display area and a part therein for driving sub-pixels in the right eye display area are connected with a same PCB among the at least one PCB.

14. A method for controlling the display panel according to claim 1, the method comprising:
  providing an un-gated signal to sub-pixels in the non-display area of the display panel within an image frame.

15. A method for controlling the display panel according to claim 1, the method comprising:
   providing a gated signal to sub-pixels in the non-display area of the display panel within an image frame to obtain gated sub-pixels; and
   providing a data signal matching a black screen to the gated sub-pixels in the non-display area.

\* \* \* \* \*

UNITED STATES PATENT AND TRADEMARK OFFICE
CERTIFICATE OF CORRECTION

PATENT NO.         : 10,761,331 B2  
APPLICATION NO.    : 16/214904  
DATED              : September 1, 2020  
INVENTOR(S)        : Li et al.

Page 1 of 1

It is certified that error appears in the above-identified patent and that said Letters Patent is hereby corrected as shown below:

In the Specification

Column 6, Line 36, replace "0" with -- 03 --.

Signed and Sealed this  
First Day of December, 2020

Andrei Iancu  
*Director of the United States Patent and Trademark Office*